United States Patent
Xu

(10) Patent No.: US 8,315,163 B2
(45) Date of Patent: Nov. 20, 2012

(54) METHOD, ACCESS POINT AND MOBILE STATION FOR IMPLEMENTING LOAD SHARING AMONG ACCESS POINTS

(75) Inventor: Baichen Xu, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 137 days.

(21) Appl. No.: 12/469,887

(22) Filed: May 21, 2009

(65) Prior Publication Data

US 2009/0290493 A1    Nov. 26, 2009

(30) Foreign Application Priority Data

May 22, 2008  (CN) ........................ 2008 1 0112355
May 22, 2008  (CN) ........................ 2008 1 0112358

(51) Int. Cl.
*G01R 31/08* (2006.01)
(52) U.S. Cl. ..................................................... 370/230
(58) Field of Classification Search ............... 370/230, 370/232, 236, 236.1, 236.2
See application file for complete search history.

(56) References Cited

U.S. PATENT DOCUMENTS

| | | | | |
|---|---|---|---|---|
| 2004/0001467 | A1* | 1/2004 | Cromer et al. | 370/338 |
| 2005/0208950 | A1* | 9/2005 | Hasse | 455/453 |
| 2006/0293060 | A1* | 12/2006 | Yang et al. | 455/453 |
| 2007/0097867 | A1* | 5/2007 | Kneckt et al. | 370/236 |
| 2007/0115906 | A1* | 5/2007 | Gao et al. | 370/338 |
| 2008/0096575 | A1  | 4/2008 | Aragon et al. | |
| 2008/0123529 | A1* | 5/2008 | Lee et al. | 370/235 |
| 2008/0170497 | A1* | 7/2008 | Jeong et al. | 370/230 |
| 2009/0005052 | A1* | 1/2009 | Abusch-Magder et al. | 455/446 |

FOREIGN PATENT DOCUMENTS

| | | |
|---|---|---|
| CN | 1601979 A | 3/2005 |
| CN | 1913467 A | 2/2007 |
| CN | 101068179 A | 11/2007 |

OTHER PUBLICATIONS

Ning Chen; "Backbone of the wireless access point load balancing switch mechanism of", Masters degree thesis, Hunan University, submitted Mar. 2006 (Machine Translation).

* cited by examiner

*Primary Examiner* — Mark Rinehart
*Assistant Examiner* — Peter Cheng
(74) *Attorney, Agent, or Firm* — Ladas & Parry LLP

(57) ABSTRACT

The present invention discloses a method for implementing load sharing among Access Points (AP), the method is applied in a wireless network including at least one Load Sharing Service (LSS), and each LSS includes at least two APs, the method includes: when receiving from a mobile Station (STA) an LSS message including information of at least one AP belonging to the same LSS and being available for the STA to access, by an AP: selecting at least one AP to be accessed by the STA from the at least one AP belonging to the same LSS and being available for the STA to access according to a predefined strategy for load sharing and load status of each AP belonging to the same LSS. The present invention further provides an AP and STA. The effect of load sharing among APs can be improved adopting the present invention.

29 Claims, 11 Drawing Sheets

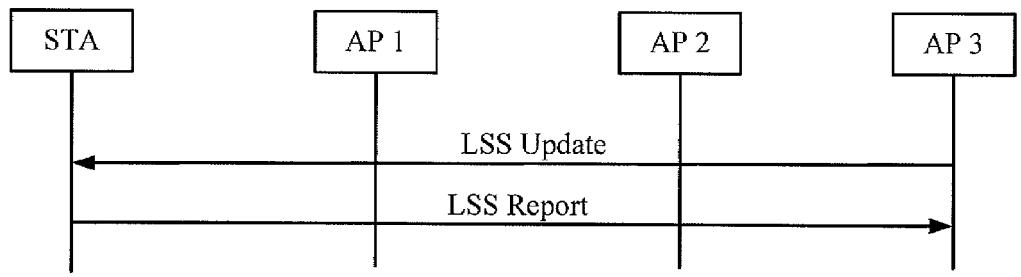
Figure 10 ( a )
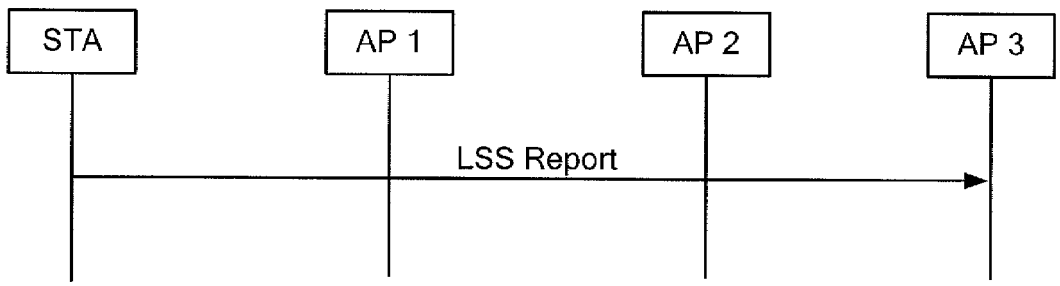
Figure 10 ( b )

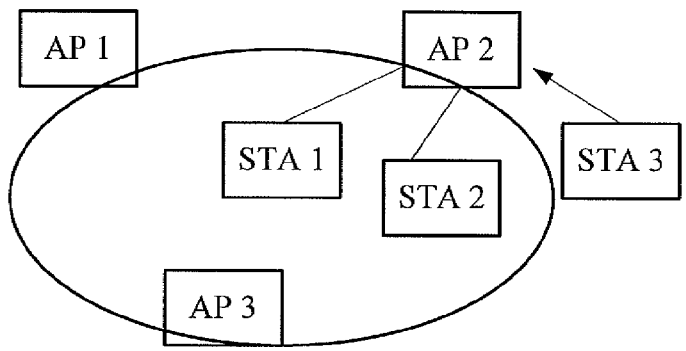
Figure 11 ( a )
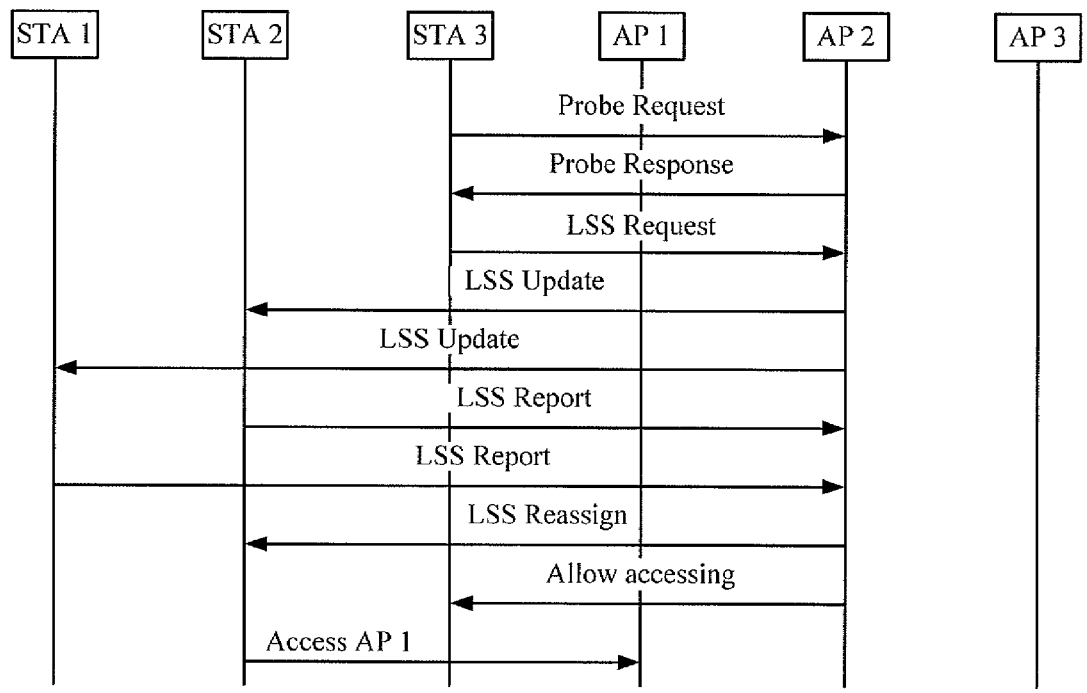
Figure 11 ( b )

US 8,315,163 B2

METHOD, ACCESS POINT AND MOBILE STATION FOR IMPLEMENTING LOAD SHARING AMONG ACCESS POINTS

FIELD OF THE TECHNOLOGY

The present invention relates to a field of mobile communication technology, particularly to a method, Access Point (AP) and mobile Station (STA) for implementing load sharing among APs.

BACKGROUND OF THE INVENTION

Services provided by APs in a Wireless Local Area Network (WLAN) may be identified by one or more Extended Service Set Identifier (ESSID), and multiple APs may use the same ESSID, as shown in FIG. 1, the network adopting the same ESSID is an Extended Service Set (ESS), and all the APs in the same ESS are differentiated by Basic Service Set Identifiers (BSS ID), wherein one BSS ID corresponds to one AP, and the network adopting the same BSS ID is a Basic Service Set (BSS).

The procedure of each STA accessing an AP in the prior art mainly includes: by the STA, scanning at least one AP first where the scanned at least one AP is available for the STA to access, selecting an AP from the scanned at least one AP according to a predefined strategy, and sending an access request to the selected AP. For instance, the STA may select, from the scanned at least one AP, the one with the strongest signal intensity to which an access request is to be sent, and after receiving an access request from an STA, the AP allows the STA to access if the AP's load does not reach a load upper limit, and otherwise, rejects the STA from accessing.

SUMMARY

Embodiments of the present invention disclose a method, AP and STA for implementing load sharing among APs, so as to improve the effect of the load sharing among APs.

The embodiments of the present invention provide a method for implementing load sharing among Access Points (AP), wherein, the method is applied in a wireless network including at least one Load Sharing Service (LSS), and each LSS includes at least two APs, the method including: when receiving from a mobile Station (STA) an LSS message including information of at least one AP belonging to the same LSS and being available for the STA to access, by an AP: selecting at least one AP to be accessed by the STA from the at least one AP belonging to the same LSS and being available for the STA to access according to a predefined strategy for load sharing and load status of each AP belonging to the same LSS.

The embodiments of the present further provide a method for implementing load sharing among Access Points (AP), wherein, the method is applied in a wireless network including at least one Load Sharing Service (LSS), and each LSS includes at least two APs, the method including: by a mobile Station (STA), sending to an AP an LSS message including information of at least one AP belonging to the same LSS and being available for the STA to access, the LSS message being provided for selecting at least one AP to be accessed by the STA according to load status of each AP belonging to the same LSS and a predefined strategy for load sharing; and, by the STA, trying to access the selected AP.

The embodiments of the present further provide an AP, wherein, a wireless network includes at least one Load Sharing Service (LSS), and each LSS includes at least two APs, the AP including: a message receiving unit, adapted for receiving an LSS message sent by an STA, the LSS message including information of at least one AP belonging to the same LSS and being available for the STA to access; a first selecting unit, adapted for selecting at least one AP to be accessed by the STA from the at least one AP belonging to the same LSS and being available for the STA to access according to a predefined strategy for load sharing and load status of each AP belonging to the same LSS when the message receiving unit receives the LSS message.

The embodiments of the present further provide an STA, wherein, a wireless network includes at least one Load Sharing Service (LSS), and each LSS includes at least two APs, the STA including: a message sending unit, adapted for sending to an AP an LSS message carrying information of at least one AP being available for the STA to access and belonging to the same LSS, the LSS message being provided for for selecting at least one AP to be accessed by the STA according to load status of each AP belonging to the same LSS and a predefined strategy for load sharing; and, an access unit, adapted for trying to access the selected AP.

BRIEF DESCRIPTION OF THE DRAWINGS

FIG. 10(a) is a flowchart illustrating an active update procedure in accordance with an embodiment of the present invention;

FIG. 10(b) is a flowchart illustrating a passive update procedure in accordance with an embodiment of the present invention;

FIG. 11(a) is a diagram illustrating a network structure in accordance with an embodiment of the present invention;

FIG. 11(b) is a flowchart illustrating a method based on the network structure shown in FIG. 11(a) in accordance with an embodiment of the present invention;

DESCRIPTION OF EMBODIMENTS OF THE INVENTION

In order to make object, technical scheme and advantages of the embodiments of present invention clearly, the embodiments of the present invention will be described in detail hereinafter with reference to the drawings.

Inventor of the present invention finds that, in a prior method of an STA's accessing an AP, it is the STA that selects the to-be-accessed AP, namely the STA actively selects the AP to be accessed, where, a predefined strategy for load sharing is usually to select the AP with the strongest signal intensity, to select any one of the scanned APs, or etc., so it is difficult to make a selection according to the AP's load status. Even if the AP allows or rejects an STA to access according to its own load status, since the strategy for load sharing at the STA is defined in advance, the STA will continue to try to access the AP according to its strategy for load sharing, while the AP will continue to reject the STA from accessing. Therefore, adopting the the prior method, the effect of load sharing is not good.

The method provided by an embodiment of the present invention includes: at least one AP participating in load sharing being defined as belonging to one Load Sharing Service (LSS) in advance, when receiving an LSS message from an STA, by an AP in the LSS, determining at least one AP available for the STA to access according to information carried in the LSS message, selecting an AP from the determined at least one AP available for the STA to access according to load status of each AP in the LSS and a predefined strategy for load sharing, and notifying the STA of accessing the selected AP. Herein, the AP receiving the LSS message may accept the STA's accessing if the selected AP is the AP receiving the LSS message itself, and the AP receiving the LSS message may notify the STA of the selected AP if the selected AP does not include the AP receiving the LSS message itself.

Thereby, the above-mentioned LSS message may be an LSS Request message, where the above method for implementing load sharing is executed when an STA requests to access an AP. The above-mentioned LSS message may also be any other LSS message, like an LSS Report message, where the above method for implementing load sharing is executed after an STA accesses an AP wherein the accessed AP designates another AP for the STA to access according to load sharing status.

Figure 1:
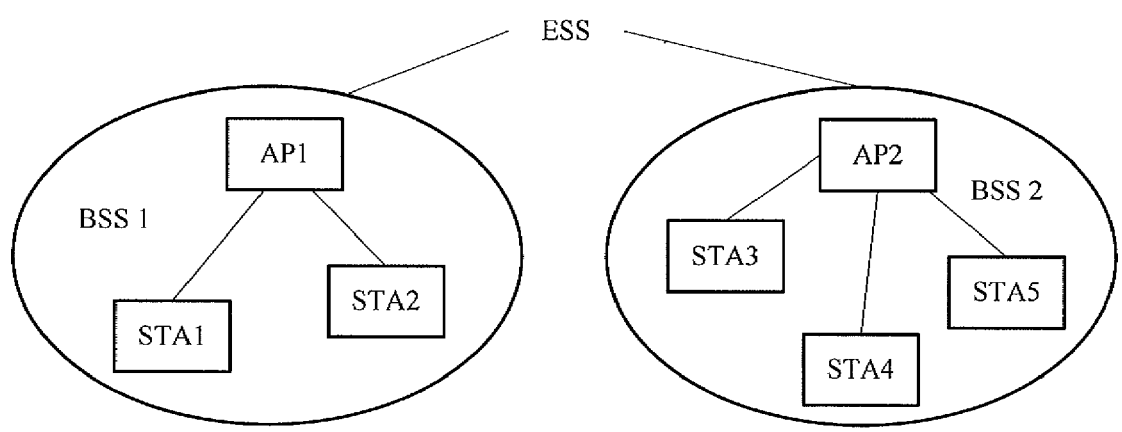
FIG. 1 is a diagram illustrating the corresponding relation between an ESS and a BSS in a WLAN.
Figure 2:
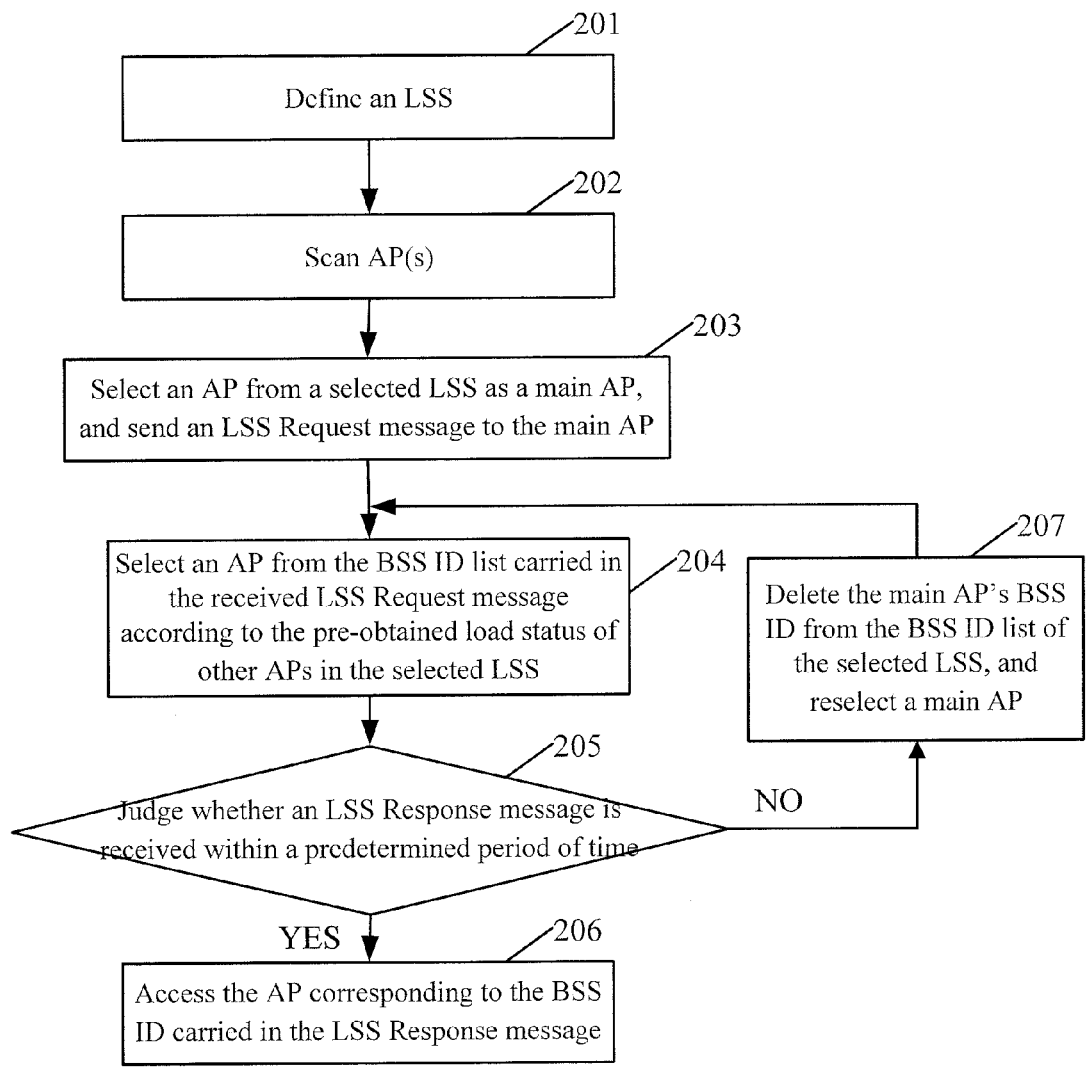
FIG. 2 is a flowchart illustrating a method in accordance with an embodiment of the present invention.

The above-mentioned method is illustrated in detail hereinafter. FIG. 2 is a flowchart illustrating the method in accordance with an embodiment of the present invention. As shown in FIG. 2, the method may include the following steps:

In Step 201, at least one AP participating in load sharing is defined as belonging to one LSS.

There may be one or more LSSes in one Extended Service Set (ESS). For instance, all of or part of the APs in an ESS participate in load sharing together, and the APs participating in load sharing are defined as belonging to one LSS and are identified by the same LSS ID; and alternatively, supposing that there may be one part of the APs in the ESS participating in a load sharing together while there may be another part of the APs participating in a second load sharing together and the two parts participate load sharing separately, the two parts may be defined as belonging to two LSSes respectively and identified by different LSS IDs.

In Step 202, an STA scans at least one AP.

In the step, the procedure of the STA scanning the at least one AP may be implemented in two manners: one is active scanning, where, the STA actively broadcasts a Probe Request, and each AP receiving the Probe Request returns a Probe Response to the STA; and the other one is passive scanning, where, the STA monitors each Beacon from each AP. Each AP carries its own BSS ID and LSS ID in the to-be-sent Probe Response or Beacon, wherein the AP that do not participate in load sharing may not carry its own LSS ID in the the to-be-sent Probe Response or Beacon or may set the LSS ID carried in the to-be-sent Probe Response or Beacon as zero. The step shown in FIG. 2 is in the active scanning manner.

The Probe Request or Beacon in the prior art has already carried the BSS ID of the AP, therefore, a field may be extended in the Probe Request or Beacon to carry the LSS ID of the LSS the AP belongs to, and the length of the extended field may be predefined as required, for instance, the length of the field may be defined as 2 bytes, the value of which ranges from 1 to 65535, besides, it is indicated that the AP does not participate in load sharing if the value of the field is zero.

In Step 203, the STA selects an LSS according to at least one LSS ID of the scanned at least one AP (the at least one LSS ID is the identifier of at least one LSS the scanned to which at least one AP belongs), selects an AP from the selected LSS as a main AP, and sends an LSS Request message to the main AP.

In the step, if there is only one LSS belonging to the at least one AP scanned by the STA, the STA will select the one LSS, and if there is more than one such LSS, the STA may select any one of the more than one LSS. And if the at least one scanned AP does not belong to any LSS, the STA will select any one of the at least one AP to try to access, i.e., the STA will send an LSS Request message to any one of the at least one AP.

The main AP may be selected by multiple methods. For instance, one AP may be selected from the LSS randomly as the main AP, or the AP with the strongest signal intensity or with the best channel quality may be selected from the LSS as the main AP, or etc. The ways of selecting the main AP according to the present invention are not limited to the above methods hereby.

Figure 3:
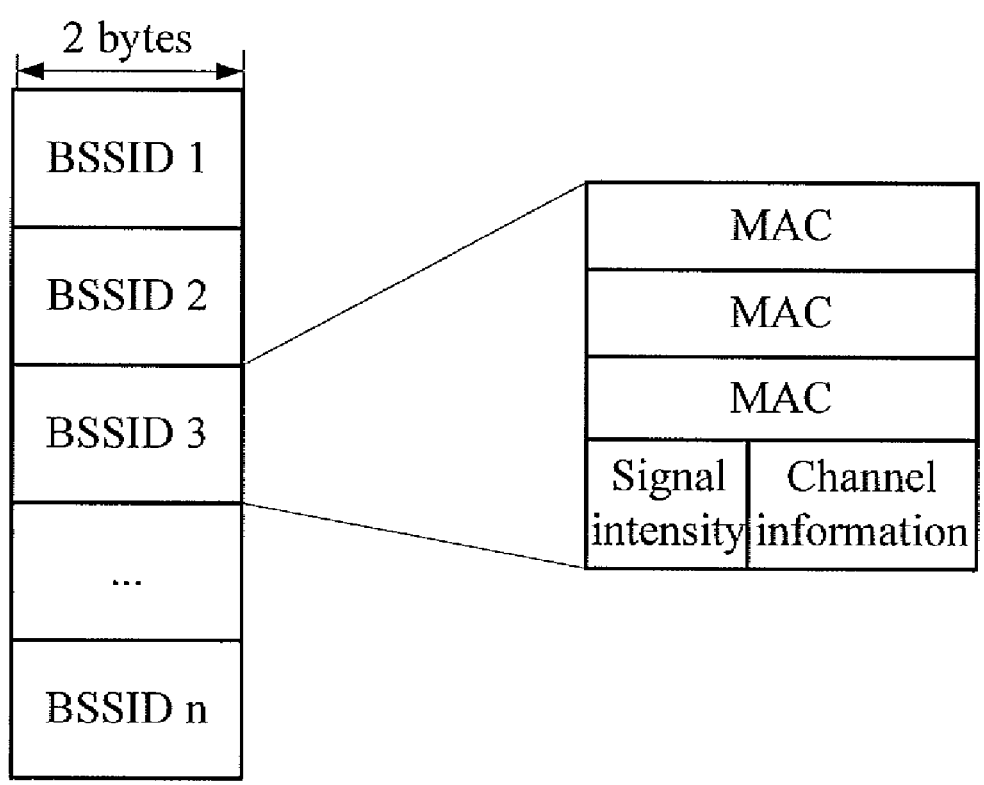
FIG. 3 is a diagram illustrating a structure of a BSS ID list in accordance with an embodiment of the present invention.

The STA may create a BSS ID list and carry the BSS ID list in the LSS Request message which is to be sent to the main AP, where, the BSS ID list includes at least one BSS ID of at least one of the scanned at least one AP, the at least one belonging to the selected LSS. The BSS ID list may be in a format as the structure shown in FIG. 3, where, information of one BSS ID (e.g., the field for one BSS ID) takes 2 bytes and includes at least one BSS ID, and the BSS ID is presented as the MAC address of the AP. The information of one BSS ID may further include information of the AP received by the STA such as signal intensity, channel information and etc., and the signal intensity and channel information may be factors considered by the main AP when designating an AP for the STA to access. For example, the main AP may select, from the BSS ID list, at least one AP the signal qualities of which are higher than a predefined threshold, and further select, among the selected at least one AP, the AP with the best load status according to a predefined strategy for load sharing. Thus it is guaranteed that the selected AP has relatively good signal quality, thereby the STA's service quality being guaranteed.

In Step 204, after receiving the LSS Request message, the main AP selects an AP from the BSS ID list carried in the received LSS Request message according to the pre-obtained load status of other APs in the selected LSS, carries the BSS ID of the selected AP in an LSS Response message, and sends the LSS Response message to the STA.

In the embodiment of the present invention, the APs belonging to the same LSS may exchange their load status via an inter-AP protocol periodically, each AP may store load status of other APs after the exchanging of load status, and the main AP may select an AP for the STA to access according to the locally-stored load status of each AP in the LSS after receiving the LSS Request message.

Wherein, the strategy for load sharing predefined for the AP may be but not limited to the followings: for instance, selecting the AP with the lowest load, selecting any one of at least one AP the load of which is lower than a load upper limit, or selecting the AP having the most available resources. And when there is little difference in load status among the APs, the selection may be made considering the AP's signal intensity and channel information acquired from the BSS ID list.

Moreover, the main AP may also make a priority order for the at least one AP corresponding to the at least one BSS ID in the BSS ID list, for instance, the AP with lower load is of higher priority, and the priority order is then sent to the STA.

In Step 205, the STA judges whether an LSS Response message is received within a predetermined period of time, if the LSS Response message is received within the predetermined period of time, Step 206 is executed, and otherwise, Step 207 is executed.

In Step 206, the STA accesses the AP corresponding to the BSS ID carried in the LSS Response message, and the whole procedure is ended.

If the main AP sends to the STA the priority order of the at least one BSS ID in the BSS ID list, the STA may first try to access the AP with the highest priority according to the priority order, and if the STA fails in accessing an AP with a higher priority, it will select an AP with a lower priority and try to access the selected AP once more.

In Step 207, the STA deletes the main AP's BSS ID from the BSS ID list of the selected LSS, reselects a main AP and sends to the newly selected main AP an LSS Request message including the BSS ID list with the previous main AP's BSS ID being deleted from, and Step 204 is executed.

Figure 4:
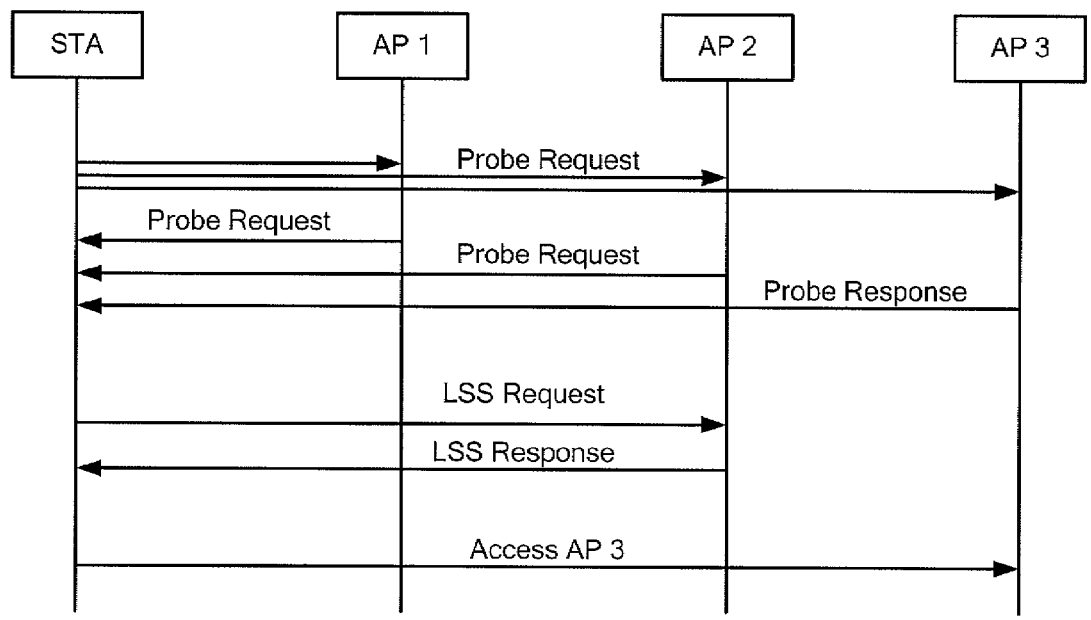
FIG. 4 is a flowchart illustrating an embodiment of the present invention.

Assuming that the STA scans three APs belonging to the same LSS, namely AP1, AP2 and AP3, the procedure of the method for implementing load sharing is as shown in FIG. 4. The STA gets to know that AP1, AP2 and AP3 belong to the same LSS by scanning, and establishes a BSS ID list, which includes BSS IDs of AP1, AP2 and AP3. In this case, the STA selects AP2 which has the strongest signal intensity as the main AP and sends to AP2 an LSS Request message including a BSS ID list; after receiving the LSS Request message, AP2 determines that AP3's load is the lowest according to the stored load status of the APs in the LSS, carries the BSS ID of AP3 in an LSS Response message and sends the LSS Response message to the STA; and after receiving the LSS Response message, the STA sends an LSS Request message to AP3 according to the BSS ID of AP3 carried in the received LSS Response message and accesses AP3 then.

Figure 5:
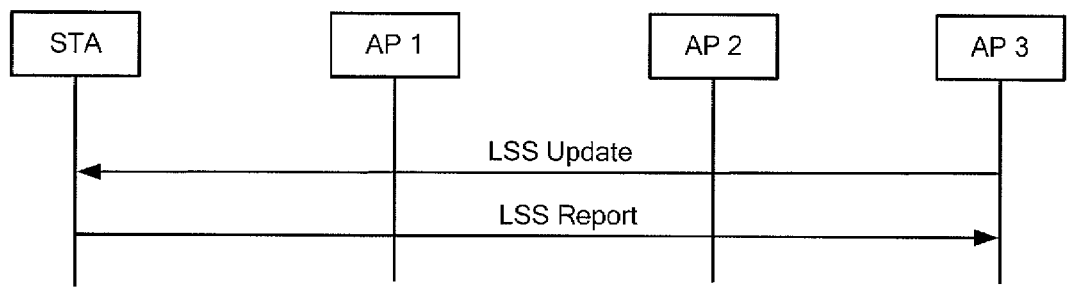
FIG. 5 is a flowchart illustrating an active update procedure in accordance with an embodiment of the present invention.

After the STA accesses an AP, to guarantee and maintain the visible relation between the STA and the AP, and for the convenience of reselecting an AP for the STA to access, it is needed to update information of the at least one LSS available for the STA to access, where the information may be updated in two manners as follows:

One manner is active updating. In this manner, the AP currently accessed by the STA may actively sends an LSS Update message to the STA; after receiving the LSS Update message, the STA scans at least one AP again, obtains at least one BSS ID corresponding to at least one AP belonging to the selected LSS in the scanned at least one AP, creates a BSS ID list including the at least one BSS ID, and sends the BSS ID list to the AP currently accessed via an LSS Report message; and, the AP currently accessed by the STA stores the BSS ID list carried in the LSS Report message if there is no such BSS ID list for the STA stored in local, and otherwise, the AP currently accessed by the STA updates the locally-stored BSS ID list for the STA according to the BSS ID list obtained from the LSS Report message. The AP may perform active updating periodically or when detecting that the STA's moving state reaches a certain level, or may perform active updating upon its own state changes. The procedure of active updating is as shown in FIG. 5, wherein AP3 is the one which the STA currently accesses.

Figure 6:
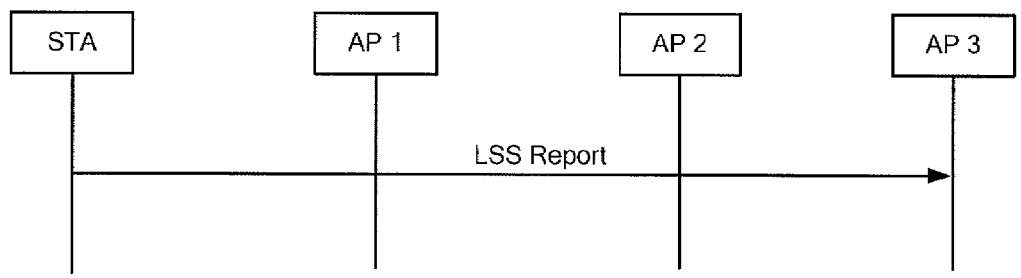
FIG. 6 is a flowchart illustrating a passive update procedure in accordance with an embodiment of the present invention.

The other manner is passive updating. In this manner, the STA scans at least one AP again, obtains at least one BSS ID of at least one AP in the scanned at least one AP, which is available for the STA to access and belongs to the selected LSS, creates a BSS ID list including the at least one BSS ID, and sends the BSS ID list to the AP currently accessed via an LSS Report message; and the currently-accessed AP passively receives the LSS Report message, acquires the BSS ID list included in the LSS Report message, stores the BSS ID list if there is no such BSS ID list for the STA stored in local, and otherwise, updates the locally-stored BSS ID list according to the acquired BSS ID list. The STA may send an LSS Report message periodically or when detecting the STA's moving state reaches a certain level, or may send an LSS Report message when detecting that the signal intensity of the AP currently accessed reduces to a threshold. The procedure of the passive updating is as shown in FIG. 6, wherein AP3 is currently accessed by the STA.

Figure 7:
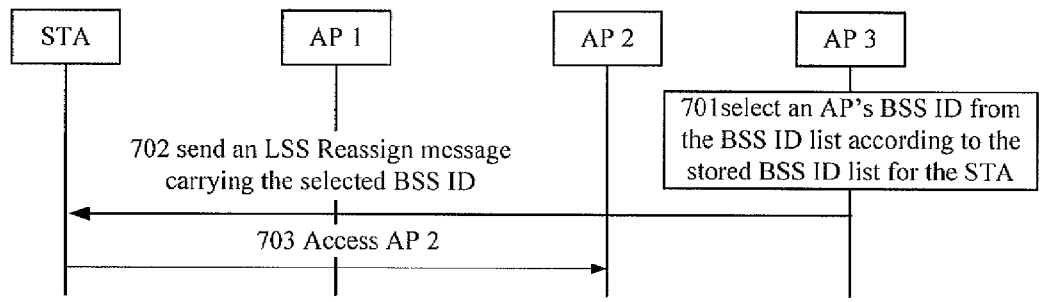
FIG. 7 is a flowchart illustrating a reassigning procedure in accordance with an embodiment of the present invention.

Besides, under some circumstances, like the channel state of the AP currently accessed by the STA is changed so that the number of the STAs currently accessing the AP can not be borne, or, the AP currently accessed by the STA needs restarting, maintenance or etc., the AP currently accessed by the STA needs to switch all of or part of the STAs currently accessing the AP to another AP, which can be implemented via an LSS reassigning procedure. FIG. 7 is a flowchart illustrating a reassigning procedure in accordance with an embodiment of the present invention, where, AP3 is currently accessed by an STA, and it is supposed that AP3 needs to switch the STA to another AP. As shown in FIG. 7, the reassigning procedure may include the following steps:

In Step 701, AP3 selects the BSS ID of an AP from the BSS ID list of the STA stored in local.

In the step, AP3 may select the BSS ID of the AP according to the locally-stored load status of each AP in the LSS to which AP3 belongs, or may select the BSS ID of the AP from the BSS ID list obtained by executing the above-mentioned updating procedure. In addition, AP3 may select the BSS ID of the AP with the lowest load or the most available resources, or select the BSS ID of any AP randomly, or etc. And alternatively, AP3 may select the BSS ID of the AP designated in advance. The strategy of selecting the BSS ID of the AP is not limited to the above examples hereby.

In Step 702, AP3 carries the selected BSS ID of the AP in an LSS Reassign message and send the LSS Reassign message to the STA.

In Step 703, after receiving the LSS Reassign message, the STA accesses the AP corresponding to the BSS ID carried in the LSS Reassign message, wherein, it is assumed that the accessed AP is AP2.

The LSS Update message and LSS Report message adopted in the above-mentioned updating procedure as well as the LSS Reassign message adopted in the reassigning procedure may be in a form of an Action frame, where, these messages may be carried in a Frame Body field of the Action Frame, and information of message type may be carried in an Action field of the Frame Body field. And the corresponding relation of the value of Action field and the message type is as shown in Table 1, where, if the Action field values 0, it is indicated that the message type is LSS Update, if the Action field values 1, it is indicated that the message type is LSS Report, if the Action field values 2, it is indicated that the message type is LSS Reassign, and otherwise, it is indicated that the message type is a reserved type. And information such as the BSS ID or the BSS ID list is carried in the information field of the Frame Body field, for instance, the information field corresponding to the type of LSS Report may carry information indicating whether the updating is successful and the updated BSS ID list, while the information field corresponding to the type of LSS Reassign may carry the designated BSS ID or BSS ID list.

TABLE 1

| Action Field | Corresponding Message Type |
| --- | --- |
| 0 | LSS Update |
| 1 | LSS Report |
| 2 | LSS Reassign |
| others | Reserved |

Figure 8:
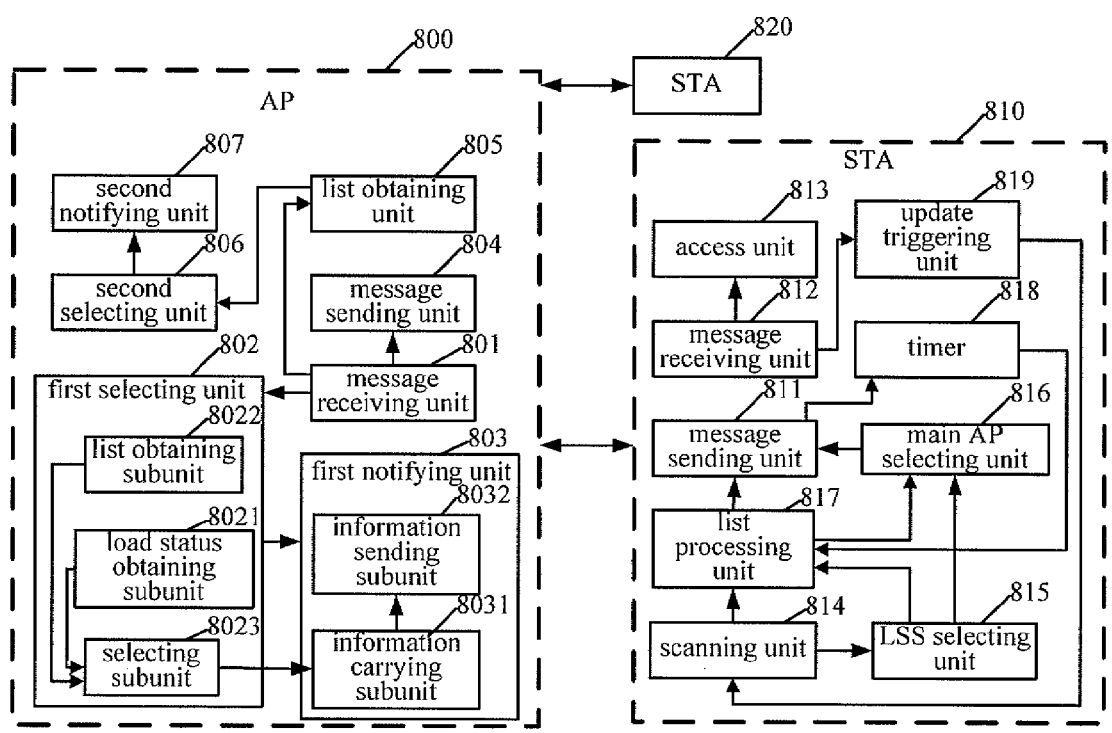
FIG. 8 is a diagram illustrating a structure of a system in accordance with an embodiment of the present invention.

The above description relates to the method provided by the embodiments of the present invention, and the system provided by the embodiments of the present invention will be illustrated hereinafter. FIG. 8 shows a structure of the system provided by the embodiments of the present invention, and as shown in FIG. 8, the system mainly includes AP 800 and STA 810.

STA 810 is adapted for sending an LSS message to AP 800, receiving from AP 800 a notification of accessing the selected AP, and trying to access the selected AP.

AP 800 is adapted for receiving the LSS message sent by STA 810, determines at least one AP available for the STA 810 to access according to information carried in the received LSS message, selecting an AP from the at least one AP available for the STA 810 to access according to a predefined strategy for load sharing and load status of each AP in the LSS to which AP 800 belongs, and notifying STA 810 of the selected AP. Herein, AP 800 may accept STA 810's accessing if the selected AP is AP 800, and AP 800 may notify STA 810 of the selected AP if the selected AP does not include AP 800.

Wherein, AP 800 may include: message receiving unit 801 and first selecting unit 802.

Message receiving unit 801 is adapted for receiving an LSS message sent by STA 810.

First selecting unit 802 is adapted for selecting an AP from the at least one AP available for the STA 810 to access according to the predefined strategy for load sharing and the load status of each AP in the LSS to which AP 800 belongs when message receiving unit 801 receives the LSS message.

AP 800 may further include First notifying unit 803 which is adapted for notifying STA 810 that the AP selected by first selecting unit 802 is to be accessed.

AP 800 may further include: message sending unit 804, adapted for broadcasting to STA 810 the BSS ID of AP 800 as well as the LSS ID of the LSS to which AP 800 belongs via Beacons.

And alternatively, the BSS ID of AP 800 as well as the LSS ID of the LSS to which AP 800 belongs may be broadcasted by another means as follows:

Message receiving unit 801 is further adapted for receiving a Probe Request sent by STA 810.

Message sending unit 804 is adapted for sending the BSS ID of AP 800 as well as the LSS ID of the LSS to which AP 800 belongs when message receiving unit 801 receives the Probe Request.

The above-mentioned first selecting unit 802 may include: load status obtaining subunit 8021, list obtaining subunit 8022 and selecting subunit 8023.

Load status obtaining subunit 8021 is adapted for periodically exchanging load status with each other AP in the LSS to which AP 800 belongs via an inter-AP protocol.

List obtaining subunit 8022 is adapted for obtaining a BSS ID list from an LSS Request message where, at least one AP corresponding to at least one BSS ID in the obtained BSS ID list is the AP available for STA 810 to access.

Selecting subunit 8023 is adapted for selecting one or more APs from the BSS ID list according to the load status of each AP obtained by load status obtaining subunit 8021 and the predefined strategy for load sharing.

Herein, first notifying unit 803 may include: information carrying subunit 8031 and information sending subunit 8032.

Information carrying subunit 8031 is adapted for, if selecting subunit 8023 selects one AP, carrying the BSS ID of the one AP selected in an LSS Response message, and if selecting subunit 8023 selects more than one AP, carrying a priority order of the more than one AP selected in an LSS Response message.

Information sending subunit 8032 is adapted for sending the LSS Response message.

The above-mentioned structure of the AP is a structure when the AP is acting as a main AP. In a network, one AP may be the main AP for one STA and may also be the one currently accessed by another STA at the same time. Supposing that the AP is currently accessed by STA 820, the AP may be of the following structure:

The AP may farther include: list obtaining unit 805.

Message receiving unit 801 is further adapted for receiving the LSS Report message sent by STA 820 accessing the AP.

List obtaining unit 805 is further adapted for obtaining from the LSS Report message the updated BSS ID list for STA 820 accessing the AP.

The above-mentioned LSS Report message may be sent by STA 820 actively when an updating condition is satisfied, or may be sent to AP 800 by STA 820 in response to an LSS Update message from AP 800.

The AP may further include: second selecting unit 806 and second notifying unit 807.

Second selecting unit 806 is adapted for selecting the BSS ID of another AP from the updated BSS ID list obtained by list obtaining unit 805 according to the load status of each AP in the LSS to which the AP (i.e., AP 800) belongs.

Second notifying unit 807 is adapted for carrying the BSS ID of the another AP selected by second selecting unit 806 in an LSS Reassign message and sending the LSS Reassign message to STA 820 which is accessing the AP so as to notify STA 820 that the another AP corresponding to the selected BSS ID is to be accessed.

Accordingly, STA 810 may include: message sending unit 811, message receiving unit 812 and access unit 813.

Message sending unit 811 is adapted for sending to AP 800 an LSS message that carries information of at least one AP available for STA 810 to access.

Message receiving unit 812 is adapted for receiving from AP 800 a notification that the selected AP is to be accessed.

Access unit 813 is adapted for trying to access the selected AP according to the above-mentioned notification.

STA 810 may further include: scanning unit 814, LSS selecting unit 815 and main AP selecting unit 816.

Scanning unit 814 is adapted for scanning at least one AP, and obtaining at least one LSS ID and at least one BSS ID from a Probe Response or a Beacon from the scanned at least one AP.

LSS selecting unit 815 is adapted for selecting an LSS according to the at least one LSS ID obtained by scanning unit 814.

Main AP selecting unit 816 is adapted for selecting, from the at least one AP scanned by scanning unit 814, an AP belonging to the LSS selected by LSS selecting unit 815 as the main AP. Suppose herein that the main AP selected is AP 800.

Message sending unit 811 is adapted for sending an LSS message to the main AP, i.e., AP 800.

The STA may further include: list processing unit 817, adapted for creating a BSS ID list including at least one BSS ID corresponding to at least one AP, which is scanned by scanning unit 814 and belongs to the selected LSS, and carrying the BSS ID list in an LSS message.

The STA may further include: timer 818, adapted for starting timing upon message sending unit 811 sends an LSS message.

List processing unit 817 is further adapted for deleting the BSS ID of the main AP (herein referring to AP800) from the BSS ID list, and sending a reselecting notification to the main AP selecting unit 816 if message receiving unit 812 has not received the notification from the main AP 800 before timer 818 expires (i.e., the time since last time timer 818 starts timing reaches a threshold).

Main AP selecting unit 816 is adapted for reselecting another AP that belongs to the selected LSS from the scanned at least one AP as the main AP after receiving the reselecting notification, and triggering message sending unit 811 to send an LSS message to the reselected main AP.

Besides, if the BSS ID list is needed to be updated, STA 810 may further include: update triggering unit 819.

Message receiving unit 812 is further adapted for receiving an LSS update message sent by the AP currently accessed by STA 810.

Update triggering unit 819 is adapted for triggering scanning unit 814 to scan each AP over again when a predefined updating condition is satisfied or message receiving unit 812 receives the LSS updating message.

List processing unit 817 is further adapted for updating the BSS ID list according to the newly scanning result of scanning unit 814, and carrying the updated BSS ID list in an LSS Report message.

Message sending unit 811 is further adapted for sending the LSS Report message to the AP currently accessed by STA 810.

And, message receiving unit 812 may be further adapted for receiving a Reassign message sent by the AP currently accessed by STA 810 if a reassigning procedure is needed.

Receiving unit 813 is further adapted for getting offline from the AP current accessed, and trying to access another AP according to the BSS ID carried in the Reassign message.

It can be seen from the above description that, the embodiments of the present invention is mainly applied in a wireless networks, which includes an LSS including at least two APs, where, when an AP receives an LSS message sent by an STA, the AP determines at least one AP available for the STA to access according to information carried in the LSS message, and the AP selects an AP from the at least one AP available for the STA to access according to a predefined strategy for load sharing and load status of each AP belonging to the LSS, and then notifies the STA that the selected AP is to be accessed. In the embodiments of the present invention, the AP to be accessed by the STA is not only determined by the STA but also determined by the AP at network side, where, the AP to be accessed by the STA is selected from the at least one AP available for the STA to access according to the load status of each AP in the LSS. Since the load status of the at least one AP available for the STA to access is considered in the selecting, for example, the AP with lower load or more available resources is selected for the STA to access, the effect of load sharing among APs is improved.

Inventor of the present invention also finds that, there may be a problem, in a prior method of an STA's accessing an AP, that, when load of the at least one AP scanned by an STA all reaches a load upper limit, for the convenience of illustration, such STA being called an isolated STA, the isolated STA is unable to access any AP.

Therefore, the above embodiments may further include the followings: when the AP receiving the LSS message (e.g., the main AP or AP 800 mentioned above) fails to select an AP that is proper to be accessed by the STA sending the LSS message, it may select a second STA from at least one STA accessing itself (i.e., the AP receiving the LSS message), determine another AP available for the second STA to access, the load of which has not reached the load upper limit, according to a predefined strategy for load sharing, notify the second STA of the another AP available for the second STA to access, and accept accessing of the STA sending the LSS message. Herein, it is determined that the AP receiving the LSS message fails to select an AP that is proper to be accessed by the STA sending the LSS message when the load of the AP receiving the LSS message has reached a load upper limit and the load of all the APs being available for the STA to access and belonging to the same LSS has reached the load upper limit, i.e., the load of all the APs scanned by the STA sending the LSS message has all reached the load upper limit.

The embodiments of the present invention also provide a method, which mainly include: after an AP receives an LSS message, e.g., an access request (an LSS Request message), sent by an isolated STA, the LSS message carrying information of all the at least one AP scanned by the isolated STA; the AP judging whether its load reaches a load upper limit, and if it is judged that the load reaches the load upper limit, the AP judging whether the load of the at least one AP scanned by the isolated STA all reaches the load upper limit according to the information of all the at least one AP scanned by the isolated STA carried in the received access request; and, if it is judged that the load of the at least one AP scanned by the isolated STA all reaches the load upper limit, the AP selecting another STA from the at least one STA accessing the AP according to a predefined strategy for load sharing, determining an AP available for the selected another STA to access the load of which has not reached the load upper limit indicating the selected another STA to access the determined AP, and allowing the isolated STA's accessing (e.g., accepting the access request from the isolated STA).

Figure 9:
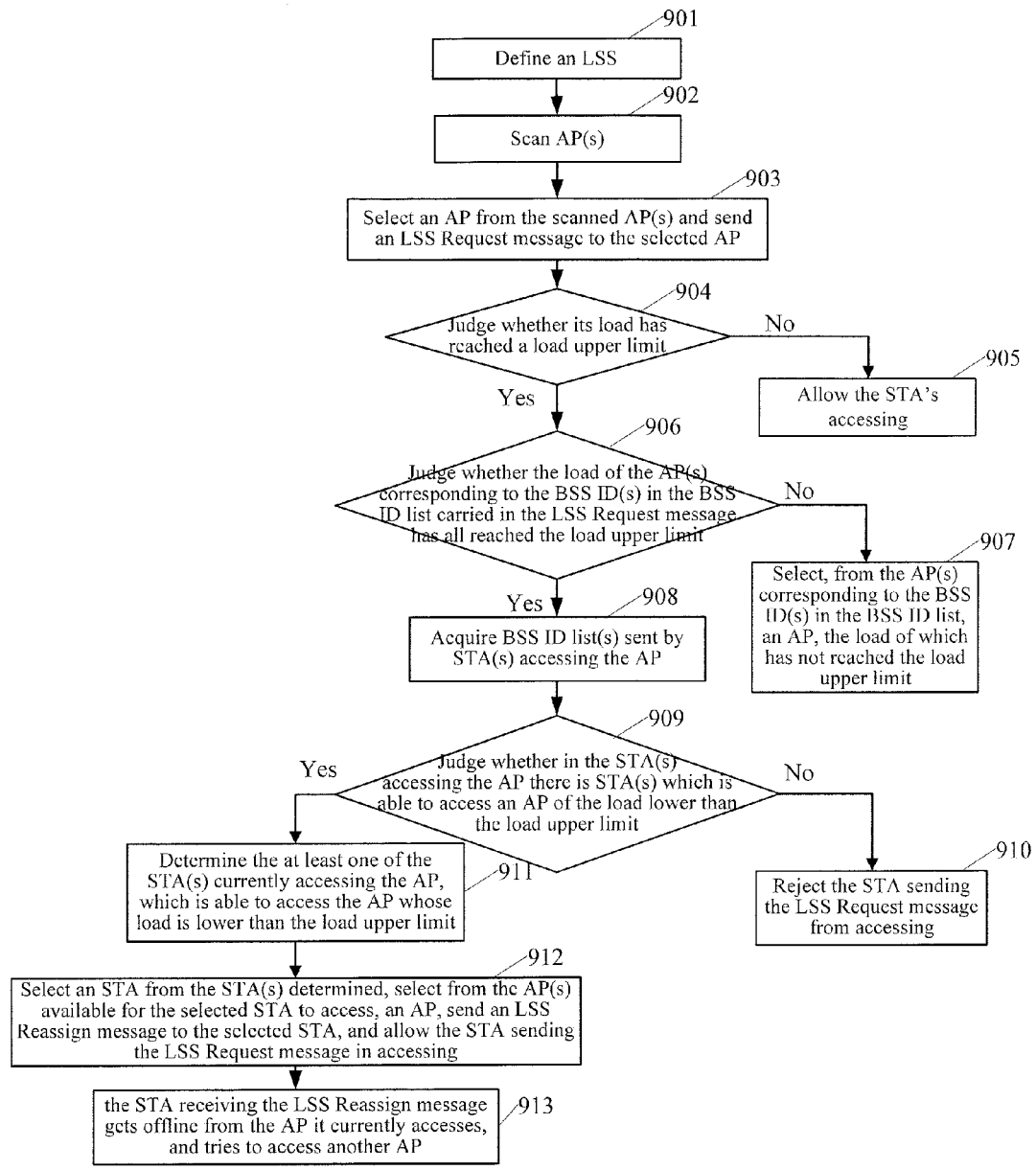
FIG. 9 is a flowchart illustrating a method in accordance with an embodiment of the present invention.

The above-mentioned method will be illustrated in detail hereinafter. FIG. 9 is a flowchart illustrating a method in accordance with an embodiment of the present invention. As shown in FIG. 9, the method may include the following steps:

In Step 901, at least one AP participating in load sharing is defined as belonging to one LSS.

Certainly, it may be not needed to divide multiple APs into more than one LSS, hereby, all the multiple APs in one ESS can be defined as belonging to the same LSS, and namely the LSS is equivalent to the ESS. The procedure provided herein can also be adopted to implement the load sharing among APs and can solve the above-mentioned problem in the prior art, too.

In Step 902, an STA scans at least one AP.

In the step, the procedure of the STA scanning the at least one AP may be implemented in two manners as mentioned in Step 202: one is active scanning, and the other one is passive scanning. The step shown in FIG. 9 is in the active scanning manner.

In Step 903, the STA selects an AP from the scanned at least one AP and sends an LSS Request message to the selected AP.

In the step, the STA may create a BSS ID list and carry the BSS ID list in the LSS Request message which is to be sent to the selected AP, where, the BSS ID list includes at least one BSS ID of at least one AP belonging to the same LSS as the selected AP. In accordance with the embodiment of the present invention, information of at least one AP scanned by each STA may be in a form of a BSS ID list or in other forms, where, information of one BBS ID in the BSS ID list at least includes the one BSS ID, the BSS ID may be presented as the MAC address of the AP corresponding to the BSS ID, and the information of one BSS ID may further include information of the corresponding AP received by the STA such as signal intensity, channel information and etc.

The AP may be selected by the STA according to a pre-defined strategy, for instance, it is to select the AP with the best signal quality, or to randomly select an AP, or to select the to-be-accessed LSS first and then select an AP in the selected LSS. Herein, the strategy is not limited to the above examples.

In Step 904, the AP receiving the LSS Request message judges whether its load has reached a load upper limit, if it is judged that its load has not reached the load upper limit, Step 905 is executed, and otherwise, Step 906 is executed.

In Step 905, the AP allows the STA's accessing, and the whole procedure is ended.

In Step 906, the AP judges whether the load of the at least one AP corresponding to the at least one BSS ID in the BSS ID list carried in the LSS Request message has all reached the load upper limit according to load status of each AP in the LSS to which it (i.e., the AP receiving the LSS Request message) belongs, if it is judged that not all the at least one AP has reached the load upper limit, Step 907 is executed, and otherwise, Step 908 is executed.

In the embodiments of the present invention, the APs belonging to the same LSS may exchange their load status via an inter-AP protocol periodically, each AP may store load status of other APs via the exchanging of load status, and the AP receiving the LSS Request message may make the above judgment according to the locally-stored load status of each AP.

In Step 907, the AP selects, from the at least one AP corresponding to the at least one BSS ID in the BSS ID list, an AP, the load of which has not reached the load upper limit, and notifies the STA to access the selected AP. The whole procedure is ended.

In Step 908, the AP acquires at least one BSS ID list sent by at least one STA accessing the AP.

The AP may acquire the locally-stored at least one BSS ID list for the at least one STA, each of which is stored after being acquired from the LSS Request message from the STA.

The AP may send an LSS Update message to each STA currently accessing the AP. After receiving the LSS Update message, each STA scans at least one AP again, updates its own BSS ID list according to the scanning result, and sends the updated BSS ID list to the AP currently accessed by the STA via an LSS Report message, so that the AP is able to acquire the BSS ID list of each STA.

The AP may also send an LSS Upate message to another STA which is possible to access another AP according to the locally-stored BSS ID list for each STA, and update the locally-stored BSS ID list according to the updated BSS ID list carried in an LSS Report message in response.

In addition, in order to maintain the stored BSS ID list of each STA accessing the AP, the AP may send an LSS Update message to each STA periodically or when a certain updating condition is satisfied, such as detecting that the STA's moving state reaches a certain level, or the AP's own state changes, or etc., so that the AP can update the locally-stored BSS ID list for each STA according to the received updated BSS ID list. Such procedure is called active updating as shown in FIG. 10(a).

Besides, passive updating is also applicable, where, the STA sends an LSS Report message to the currently-accessed AP periodically or when a certain updating condition is satisfied, such as detecting that the STA's moving state reaches a certain level, or detecting that the signal intensity of the AP currently accessed reduces to a threshold, or etc., so that the STA can update the locally-stored BSS ID list for each STA according to the received updated BSS ID list, the procedure of which is as shown in FIG. 10(b).

In Step 909, the AP judges whether, in the at least one STA accessing the AP, there is at least one STA which is able to access an AP of the load lower than the load upper limit according to the load status of each AP belonging to the same LSS as the local AP, if it is judged that there is no such STA, Step 910 is executed, and otherwise, Step 911 is executed.

In Step 910, the AP rejects the STA sending the LSS Request message from accessing, and the whole procedure is ended.

In Step 911, the AP determines the at least one of the at least one STA currently accessing the AP, which is able to access the AP whose load is lower than the load upper limit.

In another word, in the BSS ID list of the determined STA, there is at least one BSS ID corresponding to an AP whose load is lower than the load upper limit.

In the embodiments of the present invention, the APs belonging to the same LSS can periodically exchange their load status via an inter-AP protocol, and store the load status of each of the other APs in the LSS, so that, the AP can determine the STA that is able to access the AP of the load lower than the load upper limit according to the locally-stored each AP's load status.

In Step 912, the AP selects an STA from the at least one STA determined in Step 911, selects, from the at least one AP available for the selected STA to access, an AP whose load is lower than the load upper limit, carries the BSS ID of the selected AP in an LSS Reassign message, sends the LSS Reassign message to the selected STA, and allows the STA sending the LSS Request message in accessing.

In the step, a plurality of load sharing strategies may be adopted for selecting the STA, like selecting the STA able to access the most APs, or selecting the STA that can access the AP with the lowest load, or selecting any STA randomly, and so on; and, the strategy for selecting the AP to be accessed by the STA may be but not limited to the followings: for instance, selecting, among the APs available for the STA to access, the AP with the lowest load, or the AP having the most available resources, or any one of the at least one AP of the load lower than the load upper limit.

In Step 913, the STA receiving the LSS Reassign message gets offline from the AP it currently accesses, and tries to access another AP corresponding to the BSS ID carried in the LSS Reassign message.

To make the above-mentioned method more understandable, a specific example will be illustrated hereinafter. Taking a network structure shown in FIG. 11(a) for example, where, it is supposed that AP1, AP2 and AP3, participating in load sharing together, belong to an LSS, STA1 and STA2 accesses to AP2 currently, hereby, STA 3 moves to the network, and STA3 only detects AP2 whose load status has reached a load upper limit, the corresponding procedure of the method is as shown in FIG. 11(b), including the following steps:

STA3 broadcasts a Probe Request and only receives a Probe Response returned by AP2, which means that STA3 only scans AP2. Wherein, the Probe Response carries the BSS ID of AP2 and the LSS ID thereof. STA3 sends an LSS Request message carrying a BSS ID list to AP2, requesting to access AP2, wherein the BSS ID list only includes the BSS ID of AP2. After receiving the LSS Request message, AP2 determines that its load has reached a load upper limit, and that STA3 cannot access other APs whose load is lower than the load upper limit. And then, AP2 sends an LSS Update message to each of STA1 and STA2 which currently access AP2. Each of STA1 and STA2 performs scanning again after receiving the LSS Update message, updates its own BSS ID list according to the scanning result, carries the updated BSS ID list in an LSS Report message, and sends the LSS Report message to AP2. According to the updated BSS ID list of STA1 and that of STA2 as well as the load status of AP1 and AP3, AP2 determines that STA2 is able to access AP1 and the load of AP1 has not reached the load upper limit, and thereby, AP2 carries the BSS ID of AP1 in an LSS Reassign message, sends the LSS Reassign message to STA2, and allows STA3's accessing. After receiving the LSS Reassign message, STA2 gets offline from AP2 and tries to access AP1.

Figure 12:
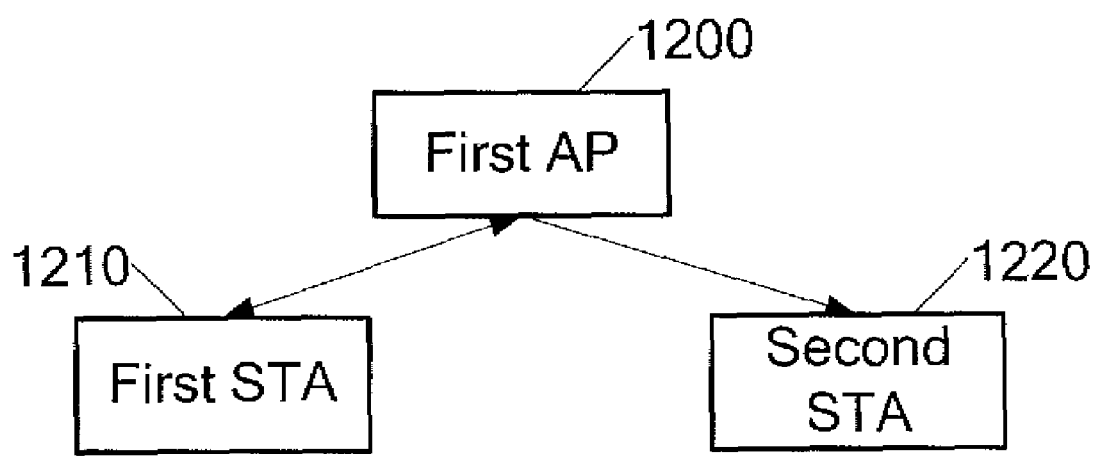
FIG. 12 is a diagram illustrating a structure of a system in accordance with an embodiment of the present invention.

The above description relates to the method provided by the embodiments of the present invention, and the system provided by the embodiments of the present invention will be illustrated hereinafter. FIG. 12 shows a structure of the system provided by the embodiments of the present invention, and as shown in FIG. 12, the system mainly includes first AP 1200, first STA 1210 and second STA 1220.

First STA 1210 is adapted for sending to AP 1200 an access request (e.g., an LSS Request message) including information of at least one AP scanned by first STA 1210.

First AP 1200 is adapted for judging whether the load of first AP 1200 has reached a load upper limit after receiving the access request sent by STA 1210, and judging whether the load of all the at least one AP scanned by first STA 1210 has reached the load upper limit according to the information of the at least one AP scanned by first STA 1210 included in the access request if it is judged that the load of first AP 1200 has reached the load upper limit, and if it is judged that the load of all the at least one AP scanned by first STA 1210 has reached the load upper limit, selecting second STA 1220 from all at least one STA accessing first AP 1200, determining a second AP according to a predefined strategy for load sharing, where, the second AP is available for second STA 1220 to access and the load of the second AP does not reach the load upper limit, sending to second STA 1220 an indication that the second AP is to be accessed by STA 1220, and allowing first STA 1210 accessing first AP 1200.

Second STA 1220 is adapted for trying to access the second AP after receiving the indication that the second AP is to be accessed by STA 1220 sent by first AP 1200.

Besides, first STA 1210 may also scan each AP before sending the access request, specifically including: first STA 1200 obtaining from each received Beacon the BSS ID of each AP sending the Beacon and the LSS ID of each LSS to which each AP sending the Beacon belongs, or broadcasting a Probe Request and obtaining from each returned Probe Response the BSS ID of each AP sending the Probe Response and the LSS ID of each LSS to which each AP sending the Probe Response belongs, and first STA 1200 selecting an LSS according to the obtained at least one LSS ID and selecting from the scanned at least one AP an AP belonging to the selected LSS. Herein, suppose that the selected AP is first AP 1200.

Information of the AP scanned by the first STA 1210 carried in the above-mentioned access request is a BSS ID list including at least one BSS ID of all at least one AP that are scanned by first STA 1210 and belongs to the same LSS as first AP 1200.

Figure 13:
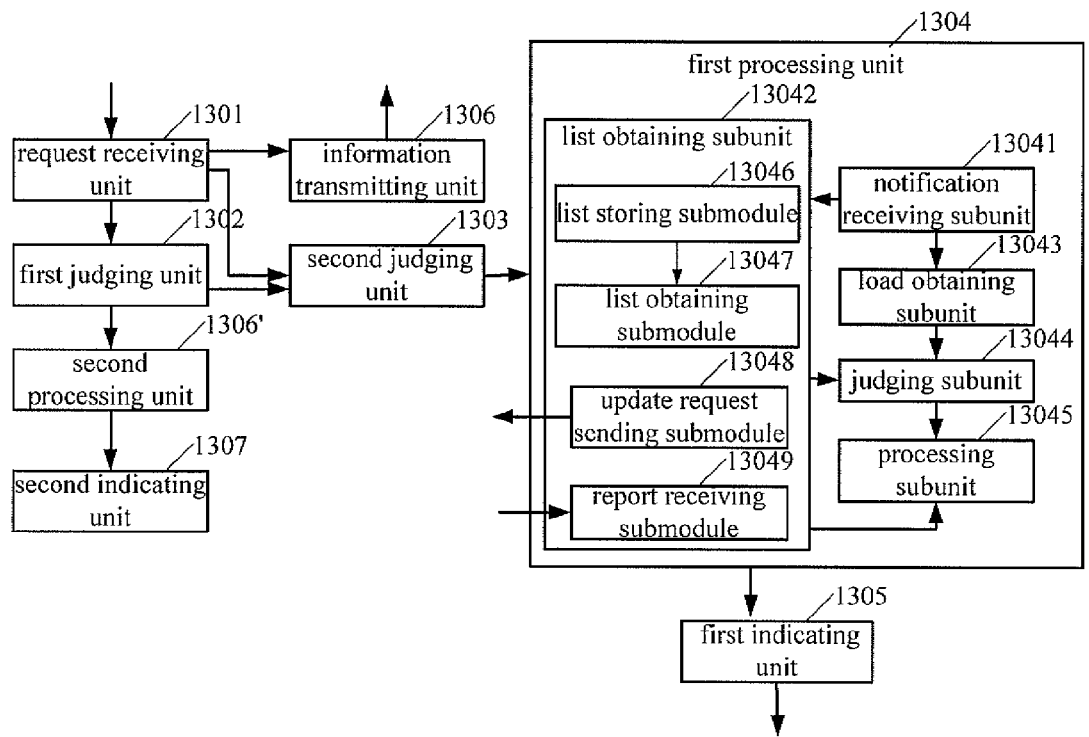
FIG. 13 is a diagram illustrating a structure of an AP in accordance with an embodiment of the present invention; and, FIG. 14 is a diagram illustrating a structure of an STA in accordance with an embodiment of the present invention.

A structure of an AP and that of an STA in the system will be illustrated in detail hereinafter. FIG. 13 shows the structure of the AP provided by an embodiment of the present invention. As shown in FIG. 13, the AP may include: request receiving unit 1301, first judging unit 1302, second judging unit 1303, first processing unit 1304 and first indicating unit 1305. Herein, request receiving unit 1301 may be configured inside message receiving unit 801 as shown in FIG. 8.

Request receiving unit 1301 is adapted for receiving an access request sent by a first STA (e.g., first STA 1210), the access request including information of all at least one AP scanned by the first STA.

First judging unit 1302 is adapted for judging whether the load of the AP has reached a load upper limit, and sending a judgment notification to second judging unit 1303 if it is judged that the load of the AP has reached the load upper limit.

Second judging unit 1303 is adapted for, after receiving the judgment notification, judging whether the load of all the at least one AP scanned by the first STA has reached the load upper limit according to the information of all the at least one AP scanned by the first STA included in the access request, and sending a process notification to first processing unit 1304 if it is judged that the load of all the at least one AP scanned by the first STA has reached the load upper limit.

First processing unit 1304 is adapted for, after receiving the process notification, selecting a second STA from at least one STA currently accessing the local AP, determining a second AP which the second STA is able to access and the load of which has not reached the load upper limit according to a predetermined strategy for load sharing, sending a trigger notification to first indicating unit 1305, and allowing the first STA's accessing.

First indicating unit 1305 is adapted for, after receiving the trigger notification, sending to the second STA selected by first processing unit 1304 an indication that the second AP is to be accessed by the second STA.

The AP may further include information transmitting unit 1306, adapted for, after request receiving unit 1301 receives a Probe Request, sending to the STA sending the Probe Request a Probe Response that carries the AP's BSS ID and the LSS ID of the LSS to which the AP belongs; or, actively broadcasting a Beacon that carries the AP's BSS ID and the LSS ID of the LSS to which the AP belongs. Herein, information transmitting unit 1306 may be configured inside message sending unit 804 as shown in FIG. 8.

Hereby, request receiving unit 1301 is further adapted for receiving the Probe Request.

Besides, the AP may also include: second processing unit 1306' and second indicating unit 1307.

Second judging unit 1303 is further adapted for sending a process notification to second processing unit 1306' after determining that among all the at least one AP scanned by the first STA, there is an AP whose load is lower than the load upper limit.

Second processing unit 1306' is further adapted for, after receiving the process notification, selecting, from all the at least one AP scanned by the first STA, an AP whose load is lower than the load upper limit, and sending a trigger notification to second indicating unit 1307.

Second indicating unit 1307 is further adapted for, after receiving the trigger notification, sending to the first STA an indication that the AP selected by second processing unit 1306' is to be accessed by the first STA.

Wherein, the above-mentioned first processing unit 1304 may include: notification receiving subunit 13041, list obtaining subunit 13042, load obtaining subunit 13043, judging subunit 13044 and processing subunit 13045.

Notification receiving subunit 13041 is adapted for receiving the process notification.

List obtaining subunit 13042 is adapted for obtaining the BSS ID list of each STA accessing the AP after notification receiving subunit 13041 receives the process notification.

Load obtaining subunit 13043 is adapted for obtaining the load of each other AP in the LSS to which the local AP belongs after notification receiving subunit 13041 receives the process notification.

Judging subunit 13044 is adapted for judging whether, in the at least one STA accessing the local AP, there is at least one second STA which is able to access an AP of the load lower than the load upper limit according to the load status of each AP in the same LSS as the local AP and the BSS ID list of each STA, if it is judged that there is no such STA, sending a rejection notification to processing subunit 13045, and otherwise, sending a selecting notification to processing subunit 13045.

Processing subunit 13045 is adapted for, rejecting the access request from the first STA if receiving the rejection notification, and if the selecting notification is received, selecting, from the at least one STA currently accessing the local AP, the second STA which is able to access an AP of the load lower than the load upper limit, determining a second AP which is available for the selected second STA to access and the load of which has not reached the load upper limit, sending a trigger notification to first indicating unit 1305, and allowing the first STA's accessing.

Where, list obtaining subunit 13042 may include: list storing submodule 13046 and list obtaining submodule 13047.

List storing submodule 13046 is adapted for storing the BSS ID list of each STA that accesses the local AP.

List obtaining submodule 13047 is adapted for obtaining the BSS ID list of each STA that access the local AP from list storing submodule 13046 when notification receiving subunit 13041 receives the process notification.

And alternatively, list obtaining subunit 13042 may be in another structure, including: update request sending submodule 13048 and report receiving submodule 13049.

Update request sending submodule 13048 is adapted for sending an LSS Update message to each STA that accesses the local AP after notification receiving subunit 13041 receives the process notification.

Report receiving submodule 13049 is adapted for receiving the LSS Report message, and obtaining the BSS ID list of each STA that accesses the local AP from the received LSS Report message.

Figure 14:
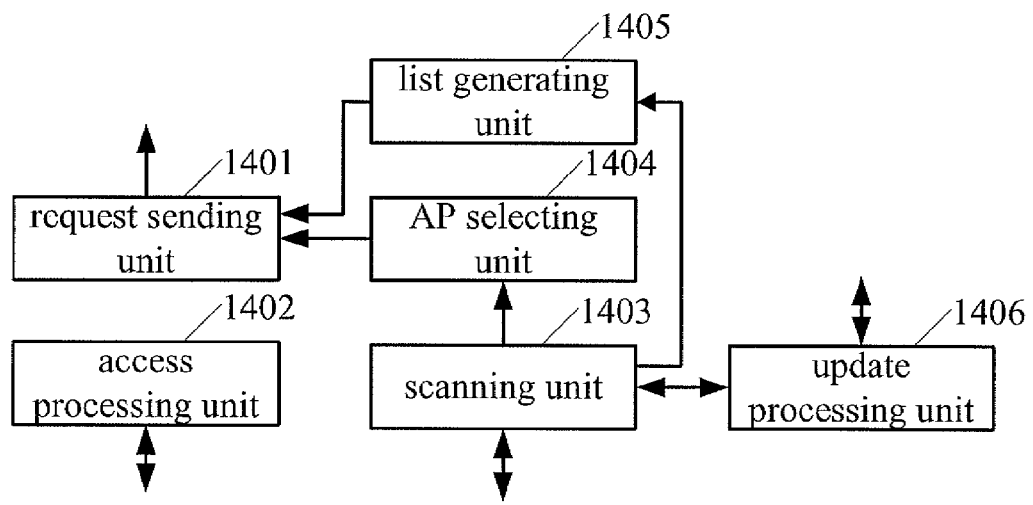

FIG. 14 shows a structure of an STA provided by an embodiment of the present invention. The first STA and second STA shown in FIG. 12 both have the same structure. As shown in FIG. 14, the STA may include: request sending unit 1401 and access processing unit 1402. Herein, request sending unit 1401 may be configured inside message sending unit 811 as shown in FIG. 8.

Request sending unit 1401 is adapted for sending to a first AP an access request, which includes information of at least one AP scanned by the STA.

Access processing unit 1402 is adapted for, after being allowed in accessing by the first AP, accessing the first AP, and after accessing the first AP, getting offline from the first AP and trying to access a second AP if receiving an indication from the first AP that the second AP is to be accessed by the STA. Herein, access processing unit 1402 is namely access unit 813 as shown in FIG. 8.

In addition, the STA may farther include: scanning unit 1403, AP selecting unit 1404 and list generating unit 1405. Herein, AP selecting unit 1404 is namely main AP selecting unit 816 as shown in FIG. 8, and list generating unit 1405 is namely list processing unit 817 as shown in FIG. 8.

Scanning unit 1403 is adapted for scanning at least one AP, specifically including: obtaining, from each received Beacon, the BSS ID and the LSS ID of the LSS to which each AP sending the Beacon belongs, or, broadcasting a Probe Request and obtaining, from each received Probe Response, the BSS ID and the LSS ID of the LSS to which each AP sending the Probe Response belongs.

AP selecting unit 1404 is adapted for selecting an LSS according to each LSS ID obtained by scanning unit 1403, selecting an AP belonging to the selected LSS from all at least one AP corresponding to the at least one BSS ID obtained by scanning unit 1403, wherein the selected AP is a first AP, and providing information of the first AP to request sending unit 1401.

List generating unit 1405 is adapted for generating a BSS ID list including at least one BSS ID of the at least one AP belonging to the selected LSS, which is obtained by scanning unit 1403, carrying the BSS ID list as information of the at least one AP scanned by the local STA in an access request.

The STA may further include: update processing unit 1406, adapted for triggering scanning unit 1403 to scan each AP over again after receiving the LSS Update message sent by the first AP, updating the BSS ID list according to the scanning result of scanning unit 1403, and sending the updated BSS ID list to the first AP via an LSS Report message. Herein, update processing unit 1406 may include update triggering unit 819 as shown in FIG. 8.

It can be seen from the above description that, in the method, system and apparatus (e.g., the STA and AP) provided by the embodiments of the present invention, a first AP judges whether its own load has reached a load upper limit after receiving an access request sent by an STA, the access request including information of all at least one AP scanned by the STA, and if it is judged that the first AP's own load has reached the load upper limit, it judges whether the load of all the at least one AP scanned by the STA has reached the load upper limit; and if it is judged that the load of all the at least one AP scanned by the STA has reached the load upper limit, it selects an STA from the STAs accessing the first AP, determines an AP which the selected STA can access and whose load has not reached the load upper limit, indicates the selected STA that the determined AP is to be accessed by the selected STA, and allows the STA sending the access request in accessing. In another word, when an AP receives the access request sent by an STA, it does not directly reject the STA from accessing if its own load has reached the load upper limit, and even if the load of all the at least one AP scanned by th STA has reached the load upper limit, namely when the STA is an isolated STA, the AP is able to adjust the STA currently accessing itself, where an STA currently accessing is indicated to switch to another AP whose load is lower than the load upper limit. Since the AP can make the isolated STA sending the access request access successfully, wireless resources can be utilized more efficiently.

The above illustration is only embodiments of the present invention and not used to restrict the protection scope of the present invention. Any modification, equivalent substitute and improvement within the principle of the present invention are in the protection scope of the present invention.

What is claimed is that:

1. A method for implementing load sharing among Access Points (AP), wherein, the method is applied in a wireless network comprising at least one Load Sharing Service (LSS) into which a plurality of APs in the wireless network are divided, and each LSS comprises at least two APs belonging to the same Extended Service Set (ESS), the method comprising:

when an AP receives from a mobile Station (STA) an LSS access request comprising information of at least one AP belonging to the same LSS and being available for the STA to access before the STA has accessed the AP, by the AP:

selecting at least one AP to be accessed by the STA from the at least one AP belonging to the same LSS and being available for the STA to access according to a predefined strategy for load sharing and load status of each AP belonging to the same LSS.

2. The method according to claim 1, the LSS access request comprising an LSS ID and a BSS ID of at least one AP scanned by the STA wherein the LSS ID and the BSS ID of one AP is sent to the STA by the one AP via a Probe Response or a Beacon.

3. The method according to claim 2, the LSS access request further comprising: signal quality information of the at least one AP belonging to the same LSS and being available for the STA to access, and the predefined strategy for load sharing indicating that the AP, signal quality of which is higher than a predetermined threshold, is to be selected.

4. The method according to claim 1, the load status of each AP belonging to the same LSS being obtained by: the AP receiving the LSS access request periodically exchanging with other APs belonging to the same LSS their load status based on an inter-AP protocol.

5. The method according to claim 4, wherein if there is one AP selected, the AP receiving the LSS access request carries the BSS ID of the one AP selected in an LSS Response message and sends the LSS Response message to the STA wherein the BSS ID carried in the LSS Response message is provided for the STA in trying to access the one AP selected; and, if there are more than one AP selected, the AP receiving the LSS access request makes a priority order for the more than one AP selected, carries the priority order in an LSS Response message and sends the LSS Response message to the STA wherein the priority order is provided for the STA in trying to access the more than one AP selected one by one in the priority order until successfully accessing one AP.

6. The method according to claim 1, further comprising:
the AP receiving the LSS access request accepting the STA's accessing if the selected AP is the AP receiving the LSS access request, and,
the AP receiving the LSS access request notifying the STA of the selected AP if the selected AP does not comprise the AP receiving the LSS access request.

7. The method according to claim 1, further comprising:
by an AP accessed by one STA, selecting another AP in a predetermined condition from at least one AP being available for the one STA to access and belonging to the same LSS according to the locally-stored load status of each AP belonging to the same LSS, and instructing the one STA to access the another AP selected.

8. The method according to claim 1, further comprising:
if the load of the AP receiving the LSS access request has reached a load upper limit and the load of all the APs being available for the STA to access and belonging to the same LSS has reached the load upper limit, by the AP receiving the LSS access request:
selecting a second STA from at least one STA accessing the AP receiving the LSS access request,
determining another AP available for the second STA to access, the load of which has not reached the load upper limit, according to a predefined strategy for load sharing, and
notifying the second STA of the another AP available for the second STA to access, and accepting accessing of the STA sending the LSS access request.

9. The method according to claim 8, wherein, the second STA is selected by the AP receiving the LSS access request by:
obtaining information of at least one AP scanned by each STA accessing the AP receiving the LSS access request;
judging whether, among the at least one STA accessing the AP receiving the LSS access request, there is an STA that is able to access another AP in the same LSS, the load of which has not reached the load upper limit, according to load status of each AP in the same LSS; and,
rejecting accessing of the STA sending the LSS access request if it is judged that there is no such STA, and otherwise, selecting a second STA that is able to access the another AP from the at least one STA accessing the AP receiving the LSS access request.

10. The method according to claim 9, wherein, the AP receiving the LSS access request obtains the BSS ID list of each STA accessing the AP receiving the LSS access request, the BSS ID list of one STA comprising at least one BSS ID of all at least one AP which is scanned by the one STA and belongs to the same LSS; and
the BSS ID list of each STA is obtained by the AP receiving the LSS access request by one of the followings:
storing the BSS ID list carried in an LSS Request message sent by each STA accessing the AP receiving the LSS access request, and obtaining the BSS ID list of each STA stored in local; and,
sending an LSS Update message to each STA accessing the AP receiving the LSS access request, and receiving the updated BSS ID list carried in an LSS Report message from each STA accessing the AP receiving the LSS access request.

11. The method according to claim 8, wherein, the AP receiving the LSS access request carries the BSS ID of the another AP in an LSS Reassign message, and sends the LSS Reassign message to the second STA to instruct the second STA to access the another AP.

12. A method for implementing load sharing among Access Points (AP), wherein, the method is applied in a wireless network comprising at least one Load Sharing Service (LSS) into which a plurality of APs in the wireless network are divided, and each LSS comprises at least two APs belonging to the same Extended Service Set (ESS), the method comprising:
by a mobile Station (STA), before the STA has accessed an AP, sending to the AP an LSS access request comprising information of at least one AP belonging to the same LSS and being available for the STA to access, the LSS access request being provided for selecting at least one AP to be accessed by the STA according to load status of each AP belonging to the same LSS and a predefined strategy for load sharing; and, by the STA, trying to access the selected AP.

13. The method according to claim 12, further comprising:
accessing of the STA being accepted by the AP receiving the LSS access request if the selected AP is the AP receiving the LSS access request, and, by the STA, trying to access the selected AP after being notified of the selected AP by the AP receiving the LSS access request if the selected AP does not comprise the AP receiving the LSS access request.

14. The method according to claim 13, further comprising:
by the STA, deleting the BSS ID of the AP receiving the LSS access request from the BSS ID list if having not be notified of the selected AP by the AP receiving the LSS access request for a predetermined period of time, reselecting, from at least one AP scanned by the STA, another AP belonging to the same LSS, and sending to the newly selected AP an LSS access request comprising a BSS ID list with the BSS ID of the AP receiving the previous LSS access request being deleted.

15. The method according to claim 14, further comprising one of the followings:
by the STA, scanning each AP again when a updating condition is satisfied, updating the BSS ID list according to the scanning result, and sending the updated BSS ID list to the AP currently accessed by the STA via an LSS Report message; and, by the STA, scanning each AP again after receiving an LSS Update message sent by the AP currently accessed by the STA, updating the BSS ID list according to the scanning result, and sending the updated BSS ID list to the AP currently accessed by the STA via an LSS Report message.

16. An Access Point (AP), wherein, a wireless network comprises at least one Load Sharing Service (LSS) into which a plurality of APs in the wireless network are divided, and each LSS comprises at least two APs belonging to the same Extended Service Set (ESS), the AP comprising:
a message receiving unit, adapted for receiving an LSS access request sent by an STA before the STA has accessed the AP, the LSS access request comprising information of at least one AP belonging to the same LSS and being available for the STA to access;
a first selecting unit, adapted for selecting at least one AP to be accessed by the STA from the at least one AP belonging to the same LSS and being available for the STA to access according to a predefined strategy for load sharing and load status of each AP belonging to the same LSS upon the message receiving unit receiving the LSS access request and before the STA has accessed the AP.

17. The AP according to claim 16, further comprising:
a first notifying unit, adapted for notifying the STA of the at least one AP selected by the first selecting unit.

18. The AP according to claim 17, further comprising:
a message sending unit, adapted for one of the followings:
broadcasting to the STA the BSS ID and the LSS ID of the local AP belongs via a Beacon; and,
sending to the STA the BSS ID and the LSS ID of the local AP via a Probe Response upon the message receiving unit receives a Probe Request.

19. The AP according to claim 18, the first selecting unit comprising:
a load status obtaining subunit, adapted for periodically exchanging with other APs in the same LSS their load status based on an inter-AP protocol, a list obtaining subunit, adapted for obtaining a BSS ID list from an LSS Request message received by the message receiving unit, at least one BSS ID in the BSS ID list corresponding to the at least one AP belonging to the same LSS and being available for the STA to access, and a selecting subunit, adapted for selecting at least one AP to be accessed by the STA from the at least one AP corresponding to the at least one BSS ID in the BSS ID list obtained by the list obtaining subunit according to the load status of each AP obtained by the load status obtaining subunit and a predefined strategy for load sharing; and, the first notifying unit comprising:
an information carrying subunit, adapted for, if there is one AP selected by the selecting subunit, carrying the BSS ID of the one AP selected in an LSS Response message, and if there is more than one AP selected by the selecting subunit, making a priority order of the more than one AP selected and carrying the priority order in an LSS Response message, and an information sending subunit, adapted for sending the LSS Response message with the information carried in by the information carrying subunit.

20. The AP according to claim 19, further comprising: a list obtaining unit, a second notifying unit and a second selecting unit,
the message receiving unit being further adapted for receiving an LSS Report message sent by the STA accessing the local AP;
the list obtaining unit being adapted for obtaining the updated BSS ID list of the STA accessing the local AP from the LSS Report message received by the message receiving unit;
the second selecting unit being adapted for selecting the BSS ID of an AP other than the local AP from the updated BSS ID list obtained by the list obtaining unit according to the load status of each AP in the same LSS; and,
the second notifying unit being adapted for carrying the BSS ID selected by the second selecting unit in an LSS Reassign message, and sending the LSS Reassign message to the STA accessing the local AP so as to notify the STA accessing the local AP that the AP corresponding to the selected BSS ID is to be accessed.

21. The AP according to claim 16, further comprising:
a first judging unit, adapted for judging whether the load of the local AP has reached a load upper limit when the message receiving unit receives the LSS access request, and sending a judging notification to a second judging unit if it is judged that the load of the local AP has reached the load upper limit;
the second judging unit, adapted for judging whether the load of the at least one AP being available for the STA sending the LSS access request to access and belonging to the same LSS has all reached the load upper limit according to the information of the at least one AP comprised in the LSS access request after receiving the judging notification from the first judging unit, and sending a process notification to a first processing unit if it is judged that the load of the at least one AP has all reached the load upper limit;
the first processing unit, adapted for selecting a second STA from at least one STA accessing the local AP after receiving the process notification from the second judging unit, determining an AP other than the local AP which is, available for the second STA to access and the load of which has not reached the load upper limit according to a predefined strategy for load sharing, sending a trigger notification to a first indicating unit, and accepting accessing of the STA sending the LSS message; and, the first indicating unit, adapted for, after receiving the trigger notification from the first processing unit, sending to the second STA selected an indication that the AP other than the local AP determined is to be accessed by the second STA.

22. The AP according to claim 21, the AP further comprising:

an information transmitting unit, adapted for, after the message receiving unit receives a Probe Request, sending to the STA sending the Probe Request a Probe Response carrying the BSS ID and the LSS ID of the local AP; or, adapted for actively broadcasting a Beacon carrying the BSS ID and the LSS ID of the local AP.

23. The AP according to claim 21, further comprising: a second processing unit and a second indicating unit, the second judging unit being further adapted for sending a process notification to the second processing unit after judging that there is an AP the load of which has not reached the load upper limit in the at least one AP available for the STA sending the LSS access request to access and belonging to the same LSS;

the second processing unit being adapted for selecting, from the at least one AP available for the STA sending the LSS access request to access and belonging to the same LSS, the AP the load of which has not reached the load upper limit after receiving the process notification from the second judging unit, and sending a trigger notification to the second indicating unit; and, the second indicating unit being adapted for, after receiving the trigger notification from the second processing unit, sending to the STA sending the LSS access request an indication that the AP selected is to be accessed.

24. A mobile station (STA), wherein, a wireless network comprises at least one Load Sharing Service (LSS) into which a plurality of APs in the wireless network are divided, and each LSS comprises at least two APs belonging to the same Extended Service Set (ESS), the STA comprising:

a message sending unit, adapted for before the STA has accessed an AP, sending to the AP an LSS access request carrying information of at least one AP being available for the STA to access and belonging to the same LSS, the LSS access request being provided for selecting at least one AP to be accessed by the STA according to load status of each AP belonging to the same LSS and a predefined strategy for load sharing; and, an access unit, adapted for trying to access the selected AP.

25. The STA according to claim 24, further comprising: a message receiving unit, adapted for receiving from the AP receiving the LSS access request a notification of the selected AP to be accessed; and, the access unit being further adapted for trying to access the selected AP according to the notification received by the message receiving unit.

26. The STA according to claim 25, further comprising:

a scanning unit, adapted for scanning at least one AP, obtaining at least one BSS ID and at least one LSS ID from a Probe Response or Beacon sent by the at least one scanned AP;

an LSS selecting unit, adapted for selecting an LSS according to the at least one LSS ID obtained by the scanning unit;

an AP selecting unit, adapted for selecting from the at least one AP scanned by the scanning unit an AP belonging to the LSS selected by the LSS selecting unit;

a list processing unit, adapted for generating a BSS ID list comprising at least one BSS ID corresponding to at least one scanned AP belonging to the LSS selected by the LSS selecting unit, and carrying the generated BSS ID list in the LSS access request sent by the message sending unit; and, the message sending unit, adapted for sending the LSS access request to the AP selected by the AP selecting unit.

27. The STA according to claim 26, further comprising: a timer, adapted for starting timing upon the message sending unit sends an LSS access request, the list processing unit being further adapted for, if the message receiving unit has not received the notification from the selected AP before the timer expires, deleting the BSS ID of the selected AP from the BSS ID list and sending a reselecting notification to the AP selecting unit; and, the AP selecting unit being further adapted for reselecting another scanned AP belonging to the selected LSS after receiving the reselecting notification, and triggering the message sending unit to send an LSS access request to the reselected AP.

28. The STA according to claim 27, further comprising: an update triggering unit, the message receiving unit being further adapted for receiving an LSS Update message sent by the AP currently accessed by the STA;

the update triggering unit being adapted for triggering the scanning unit to scan each AP again when a predetermined updating condition is satisfied or the message receiving unit receives the LSS Update message;

the list processing unit being further adapted for updating the BSS ID list according to the scanning result of the scanning unit, and carrying the updated BSS ID list in an LSS Report message; and, the message sending unit being further adapted for sending the LSS Report message with the updated BSS ID list carried in to the AP currently accessed by the STA.

29. The STA according to claim 24, the access unit being further adapted for accessing one AP if the one AP accepts accessing of the STA, and getting offline from the AP currently accessed by the STA and trying to access another AP if being instructed by the AP the STA currently accesses to access the another AP.

* * * * *